(12) United States Patent
Glaudel et al.

(10) Patent No.: US 8,118,054 B2
(45) Date of Patent: Feb. 21, 2012

(54) SOLENOID NEEDLE VALVE ASSEMBLY

(75) Inventors: Stephen P. Glaudel, Lebanon, NJ (US); Jan Willem Van Rijswijk, Rhenen (NL)

(73) Assignee: Brooks Instrument, LLC, Hatfield, PA (US)

(*) Notice: Subject to any disclaimer, the term of this patent is extended or adjusted under 35 U.S.C. 154(b) by 192 days.

(21) Appl. No.: 12/638,339

(22) Filed: Dec. 15, 2009

(65) Prior Publication Data
US 2010/0147390 A1 Jun. 17, 2010

Related U.S. Application Data

(60) Provisional application No. 61/122,604, filed on Dec. 15, 2008.

(51) Int. Cl.
*F16K 31/02* (2006.01)
*F15D 1/00* (2006.01)
(52) U.S. Cl. .............. 137/270; 137/315.03; 251/129.02; 251/129.15; 335/255
(58) Field of Classification Search ......... 137/1, 315.03, 137/269, 270; 251/129.15, 129.02; 335/255
See application file for complete search history.

(56) References Cited

U.S. PATENT DOCUMENTS

| | | | |
|---|---|---|---|
| 4,592,533 A | 6/1986 | Guglielmi et al. | |
| 4,986,299 A * | 1/1991 | Schultz | 137/269 |
| 5,358,005 A * | 10/1994 | van Prooijen et al. | 251/129.02 |
| 5,669,406 A * | 9/1997 | Gluf, Jr. | 137/270 |
| 6,040,752 A * | 3/2000 | Fisher | 335/234 |
| 6,120,003 A * | 9/2000 | Lubischer et al. | 251/129.02 |
| 6,443,420 B1 * | 9/2002 | Hettinger | 251/30.04 |
| 6,701,959 B1 | 3/2004 | Flynn et al. | |
| 7,299,904 B2 * | 11/2007 | Wagu et al. | 188/113.2 |

* cited by examiner

*Primary Examiner* — Kevin Lee
(74) *Attorney, Agent, or Firm* — Patton Boggs LLP

(57) ABSTRACT

The disclosed embodiments include an apparatus and a method for controlling fluid flow. In accordance with certain of the disclosed embodiments, a valve is disclosed that comprises a yoke that encases a coil. The yoke has a gap adjacent to a central aperture of the yoke. A core tube is placed in the central aperture. The core tube has a core slidingly disposed within an interior chamber for controlling a fluid flow rate from a flow inlet to a flow outlet. A current is provided to the coil. Magnetic flux, generated by the coil in response to the current, is directed through the gap to cause the core to move proportionally based on the amount of current provided to the coil for changing the fluid flow rate from the flow inlet to the flow outlet.

15 Claims, 6 Drawing Sheets

SOLENOID NEEDLE VALVE ASSEMBLY

CROSS REFERENCE TO RELATED APPLICATION

This Application claims priority to U.S. Provisional Patent Application Ser. No. 61/122,604 filed on Dec. 15, 2008, the entire contents of which are hereby incorporated by reference.

BACKGROUND OF THE INVENTION

Measurement of a fluid flow-rate is an important practice in a wide variety of applications. For example, in biotechnology or semiconductor applications, the flow rate of gases is critical to growth (of cells, solid-state layers, etc.). Too much flow or too little flow will "spoil" the process result. Flow-measurement can come via several different technologies, such as differential-pressure, thermal-mass-flow, and coriolis-mass-flow, but many others exist as well.

However, not only is the measurement of these flows important, but the end-user is frequently extremely concerned about the control of those flow rates. This control is most typically performed via a "modulating" or "proportional" control-valve, passing more or less fluid (gas or liquid) from a source (e.g. tank) to a process/destination. In other words, as the process needs more or less flow, a "setpoint" (desired flow) will be calculated and communicated to a "loop-controller," then compared to the actual flow (process-measured-variable), and the difference will cause the motion of the valve (more-open, or more-closed).

As with flow measurement technologies, there are many techniques to build a control-valve, but they typically involve opening or closing a path for fluid to pass through. Typical constructions are: poppet, ball, needle, pinch, guillotine, etc. Each has its performance advantages and disadvantages, as well as cost differences. So, the unique process-application will determine the best choice.

For safety reasons, valves come in several configurations, so that when power is removed from the system, the valve will go open, closed, or will "fail-in-place." Most often, a normally-closed valve is selected (e.g. stop adding fluid to a process), but a normally-open valve is sometimes specified as well.

In the context of low flow measurement and control devices, the fluid quantities passed through the devices are on the order of several cm3/minute of gas, or several grains/hour of liquids. These small quantities are typically used for a critical component, such as dopants, catalaysts, additives, etc. These low flow devices are also typically quite small. Thus, the manufacture of these small devices is quite demanding. Additionally, the opportunity for a process to block these small devices and associated cavities is high.

In the low flow context, many of the valve construction types mentioned above are simply impractical to build due to small geometries. For manual adjustments, a needle-valve is sometimes employed. The needle valve typically includes a tapered pin that is inserted into or withdrawn from an orifice. As the pin is withdrawn, more orifice cross-sectional area is available for flow to pass. The typical length of the needle is on the order of a centimeter or more. However, as manual controls give way to automated controls, this long tapered needle requires a large positioner to be moved, which causes the valve to become bulky.

Another common low flow valve is a poppet-valve. In a poppet-valve, a flat seat is placed over an orifice to close off flow or lifted a small amount, so that the fluid may flow through an annular ring and then pass through the orifice. Unlike the aforementioned needle-valve, the movement of the poppet, from open to close or vice-versa, represents a very short stroke. Consequently, a solenoid is often the positioner employed with the low flow poppet valves.

BRIEF SUMMARY OF THE INVENTION

Embodiments of the disclosed invention include an apparatus and a method for controlling fluid flow. In one embodiment, a valve for controlling fluid flow is disclosed comprising a mounting body having a fluid inlet and a fluid outlet; a core tube adjacent to the mounting body, the core tube having an interior chamber with a proximal end and a distal end; a core slidingly disposed within the core tube interior chamber, the core having a proximal end, a distal end and a center located between the proximal end and the distal end, the core movable between an open position and a closed position relative to the mounting body, wherein the core distal end engages at least one of the mounting body fluid inlet and mounting body fluid outlet to block fluid flow therethrough when the core is in the closed position; at least one biasing member operable to bias the core in at least one of the open and closed positions; a coil disposed about the core tube, the coil operable to cause the core to move between the open position and the closed position when energized; and a yoke encasingly disposed about the coil, the yoke having an opening adjacent to the core tube, the opening having a center, wherein a distance between the core center and the yoke opening center decreases when the coil is energized.

In another embodiment, a yoke for with a valve is disclosed comprising a top yoke hub; a bottom yoke hub; an inner portion housing a coil; an aperture for receiving a core tube, the core tube having a core slidingly disposed within an interior chamber; and a gap between the top yoke hub and the bottom yoke hub, the gap having a center at a midpoint between a first end of the top yoke hub and a second end of the bottom yoke hub, and wherein magnetic flux generated by the coil when energized is directed through the gap to cause the core to move.

Still, in yet another embodiment, a method of controlling fluid flow is disclosed comprising encasing a coil in a yoke, the yoke having a gap adjacent to a central aperture of the yoke; placing a core tube in the central aperture of the yoke; the core tube having a core slidingly disposed within an interior chamber for controlling a fluid flow rate from a flow inlet to a flow outlet; providing current to the coil; and directing magnetic flux, generated by the coil in response to the current, through the gap to cause the core to move for changing the fluid flow rate from the flow inlet to the flow outlet.

DETAILED DESCRIPTION

In the following detailed description of several illustrative embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is not to be taken in a limiting sense, and the scope of the present invention is defined only by the appended claims.

Figure 1:
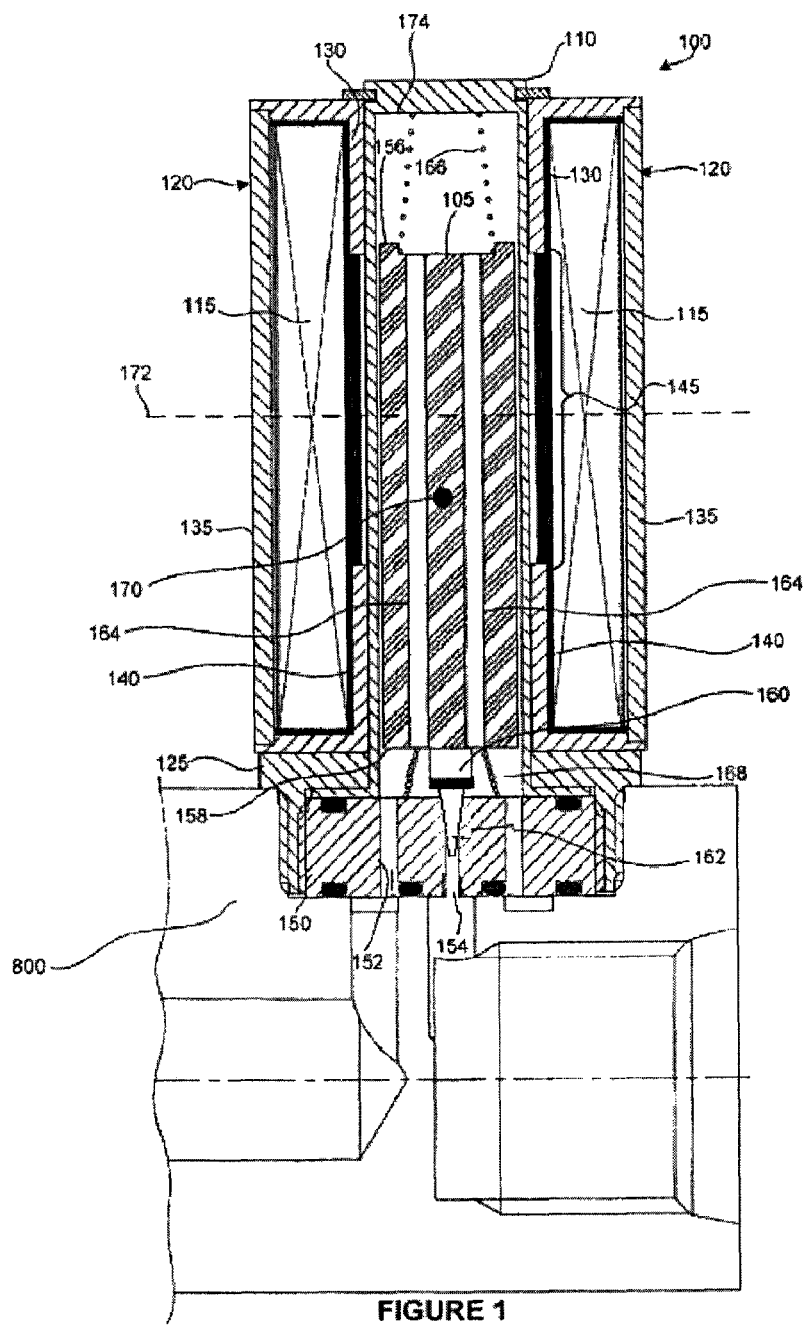
FIG. 1 is a schematic, cross-sectional view of a normally closed valve assembly showing a valve assembly in a closed position in accordance with certain of the embodiments.
Figure 2:
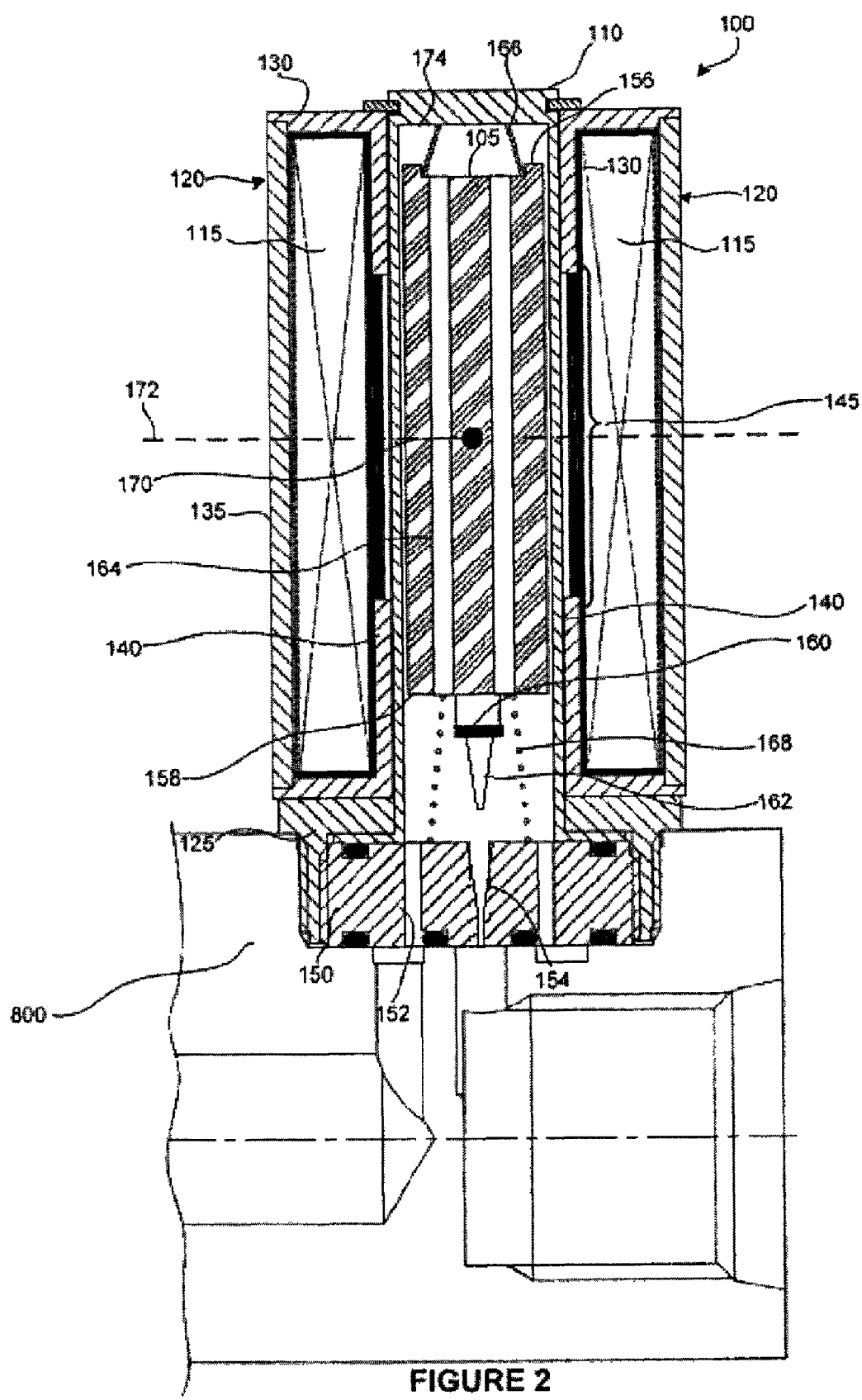
FIG. 2 is a schematic, cross-sectional view of the valve assembly of FIG. 1 showing the valve assembly in an open position in accordance with certain of the embodiments.

Referring now to FIGS. 1 and 2, an illustrative valve assembly 100 is shown. The valve assembly 100 includes a core 105, core tube 110, coil 115, yoke assembly 120, and mounting body 125. The illustrative valve assembly 100 has a circular cross-section when viewed in a top plan view; however, it will be appreciated that the valve assembly 100 may have any suitable cross-section. The mounting body 125 includes an orifice body 150. The orifice body 150 includes a flow inlet 152 and a flow outlet 154. The mounting body 125 is operable to fluidly couple the valve assembly 100 to a flow body 800, such as a fluid conduit for transporting or carrying a fluid from one point to another, such that the orifice body 150 is disposed within a passageway for the flow of fluid whereby the fluid is capable of passing from the flow inlet 152 to the flow outlet 154. As will be discussed further below, the core 105 is operable to control the amount of fluid that is allowed to pass from the flow inlet 152 to the flow outlet 154 and thereby control the amount and/or rate of fluid that is permitted to pass through the flow body.

The core tube 110 encases the core 105. The core tube 110 is formed from any suitable material that is not ferromagnetic. The core tube 110 may be mounted to the mounting body 125 by any suitable means, including, but not limited to, adhesive, welding, mechanical fasteners, or any other suitable fastening means. Alternatively, the core tube 110 may be integrally formed with the mounting body 125. In yet another alternative, the core tube 110 may merely rest atop the mounting body 125.

Figure 1A:
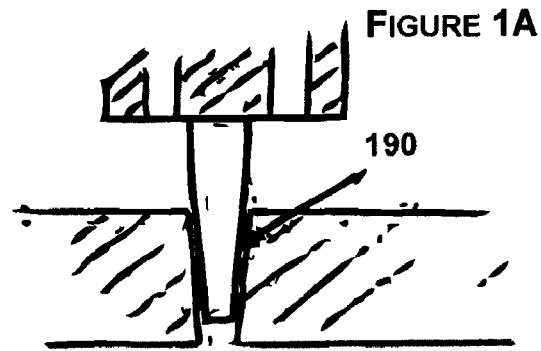
FIG. 1A is an exploded cross-sectional view of a needle in contact with an outlet for stopping fluid flow in accordance with certain of the embodiments.

The core 105 includes a proximal end 156 and a distal end 158. The distal end 158 includes a stop 160 and a needle 162 projecting therefrom. The needle 162 and flow outlet 154 are complimentarily shaped such that movement of the needle 162 relative to the flow outlet 154 permits proportional control of fluid passing from the flow inlet 152 through the flow outlet 154. For example, in the illustrative embodiment, the needle 162 and flow outlet 154 have complimentary tapered cross-sections whereby the needle 162 may be received within the flow outlet 154 such that when the needle 162 fully engages the flow outlet 154, the stop 160 rests atop the orifice body 150 and fluid is not permitted to pass through the flow outlet 154; this is referred to as the closed position. In other words, the stop 160 provides a means to close the valve and prevent fluid to pass through from inlet 152 to outlet 154. Alternatively, in some embodiments, fluid flow may be stopped by having a side surface 190 of needle 162 fully contact the sides of outlet 154 as core 105 is moved towards a closed position, e.g. by means of a conical needle into a conical flow outlet hole as illustrated in FIG. 1A. As will be discussed further below, as the core 105 is moved from the closed position to an open position, the needle 162 is withdrawn from the flow outlet 154 and fluid is permitted to pass from the flow inlet 152 to the flow outlet 154. As the needle 162 is withdrawn further from the flow outlet 154, the amount of fluid that is permitted to pass from the flow inlet 152 to the flow outlet 154 increases. While the illustrative embodiment shows the needle 162 and flow outlet 154 as having tapered cross-sections, it will be appreciated that the needle 162 and flow outlet 154 may have any suitable complimentarily shaped cross-sections. Additionally, in the illustrative embodiment, the core 105 is formed from a ferromagnetic material such that the core 105 may be excited and moved by the coil 115 when the coil 115 is energized; however, it will be appreciated that the core 105 may be formed from any suitable magnetic material. Moreover, the core 105 may have one or more grooves or slots 164 to prevent dashpot effects that may otherwise develop as the core 105 is moved between an open and closed position while fluid is passing from the flow inlet 152 to the flow outlet 154. A dashpot effect may cause core movement resistance due to viscous friction when the core 105 is moving and fluid volumes are displaced. Therefore, grooves 164 in the core 105 may lower the viscous friction to avoid negative effects on fluid control.

The core 105 is slidingly and concentrically disposed within the core tube 110 such that the core 105 is movable between an open position and a closed position relative to the orifice body 150. A first spring 166 is positioned between the proximal end 156 of the core 105 and the upper end of the interior portion of the core tube 110. A second spring 168 is positioned between the distal end 158 of the core 105 and the mounting body 125 near the upper portion of the orifice body 150. In the illustrative embodiment, the first spring 166 is a conical compression spring and the second spring 168 is a conical compression spring where the spring constant (k) of the first spring 166 is greater than the spring constant of the second spring 168 such that the core 105 is biased to a closed position when the coil is not energized, i.e., the valve assembly 100 is "normally closed" (FIG. 1). As will be discussed further below, the core 105 remains in a closed position unless or until the coil 115 is energized. In an alternative embodiment, the position of the first and second springs 166, 168 may be reversed such that the core 105 is biased to an open position when the coil 115 is not energized, i.e., the valve assembly 100 is "normally open" and remains open unless or until the core 105 is energized. Also, while the illustrative embodiment employs conical compression springs, it will be appreciated that any type or number of resilient members, or biasing members, may be used to bias the core 105 to an open position, a closed position, or any other suitable position.

The coil 115 is disposed about the core tube 110. The coil 115 may be any magnetic inductive coil operable to generate a magnetic field that is capable of moving the core 105 between a closed position and an open position. The coil 115 is at least partially encased by the yoke assembly 120, which is formed from a ferromagnetic material or any other suitable magnetic material. The coil 115 and yoke assembly 120 may be maintained in position around the core tube via a retaining clip disposed about the top of the core tube and top of the yoke assembly 120; however, it will be appreciated that any suitable retaining means may be employed. The yoke assembly 120 includes a top yoke hub 130, a yoke 135 and a bottom yoke hub 140. Each of the top yoke hub 130, bottom yoke hub 140 and yoke 135 are generally tubular bodies and include an aperture for receiving the core tube 110 therein. A portion of each of the yoke hubs 130, 140 may extend into the yoke 135. The top yoke hub 130 and bottom yoke hub 140 may be coupled to the yoke 135 by any suitable means, including, but not limited to, adhesive, welding, mechanical fasteners, or any other suitable fastening means. Alternatively, the yoke hubs 130, 140 may abut or rest on or against the yoke 135.

The yoke assembly 120 is arranged such that a gap 145 exists between the top yoke hub 130 and bottom yoke hub 140. The gap 145 includes a center 172 that is the midpoint between the ends of the portions of the yoke hubs 130, 140 that extend into the yoke 135. The gap 145 is adjacent core tube 110 and permits magnetic flux generated by the coil 115, when the coil 115 is energized, to bridge the gap in the yoke assembly 120 through the core 105 and causes the core 105 to move. In other words, the yoke assembly 120 directs the magnetic flux generated by the coil 115 through the gap 145 such that when the coil 115 is energized, the center 170 of the core 105 (i.e., the core's center of gravity) is drawn towards the center 172 of the gap 145. Proportional control of core 105 is provided by controlling the amount of current provided to the coil 115. Thus, slight current provided to the coil 115 provides slight movement of the core 105, and, in one embodiment, when the coil 115 is fully energized, the center 170 of the core 105 and the center 172 of the gap 145 are substantially aligned. In other words, the distance between the center 170 of the core 105 and the center 172 of the gap 145 decreases as the coil is energized. The change in the distance between the center 170 of the core 105 and the center 172 of the gap 145 is in proportion to an amount of current provided to the coil 115. Therefore, as will be further described, the change in fluid flow from the flow inlet 152 to the flow outlet 154 is in proportion to an amount of current provided to the coil 115 to move the core 105 in the direction of an open position or a closed position.

When the valve assembly 100 is normally closed, as in the illustrative embodiment shown in FIGS. 1 and 2, the gap 145 is nearer the upper portion 174 of the core tube 110. Alternatively, when the valve assembly is normally open, the gap is nearer the mounting body 125. In a normally closed valve assembly, as shown in FIGS. 1-2, when the center 170 of the core 105 is aligned with the center 172 of the gap 145, the valve assembly 100 is fully open. In an alternative embodiment, in a normally open valve assembly, when the center of the core is aligned with the center of the gap, the valve assembly is fully closed.

The following description will be made in reference to the normally closed valve assembly 100 of FIGS. 1 and 2; however, it will be appreciated that the valve assembly may be normally open and remain within the scope of the present invention. In use, the mounting body 125 is coupled to a flow body such that the orifice body 150 is introduced to a passageway for the flow of fluid whereby fluid is only permitted to further pass through the flow body by passing from the flow inlet 152 to the flow outlet 154. In the closed position, the needle 162 is fully engaged with the flow outlet 154 such that the stop 160 rests atop the orifice body 150 and fluid is not permitted to pass from the flow inlet 152 to the flow outlet 154.

As current is provided to the coil 115, the biasing force provided by the first spring 166 is overcome and the center 170 of the core 105 is pulled towards the center 172 of the gap 145 of the yoke assembly 120 and the needle 162 is drawn away from the flow outlet 154 thereby permitting fluid to pass from the flow inlet 152 to the flow outlet 154. The second spring 168 begins to extend and serves to maintain the core 105 in a centered position relative to the core tube 110 and coil 115. Slight increases in current provided to the coil 115 result in slight movement of the core 105 and slight opening of the valve assembly 100. As the current provided to the coil 115 increases, the core 105 is drawn further from the orifice body 150 the distance between the needle 162 and the flow outlet 154 increases; whereby the amount of fluid that is permitted to pass from the flow inlet 152 to the flow outlet 154 increases. When the coil 115 is fully energized, the center 170 of the core 105 is aligned with the center 172 of the gap 145 of the yoke assembly 120 and the valve is fully open.

Figure 3:
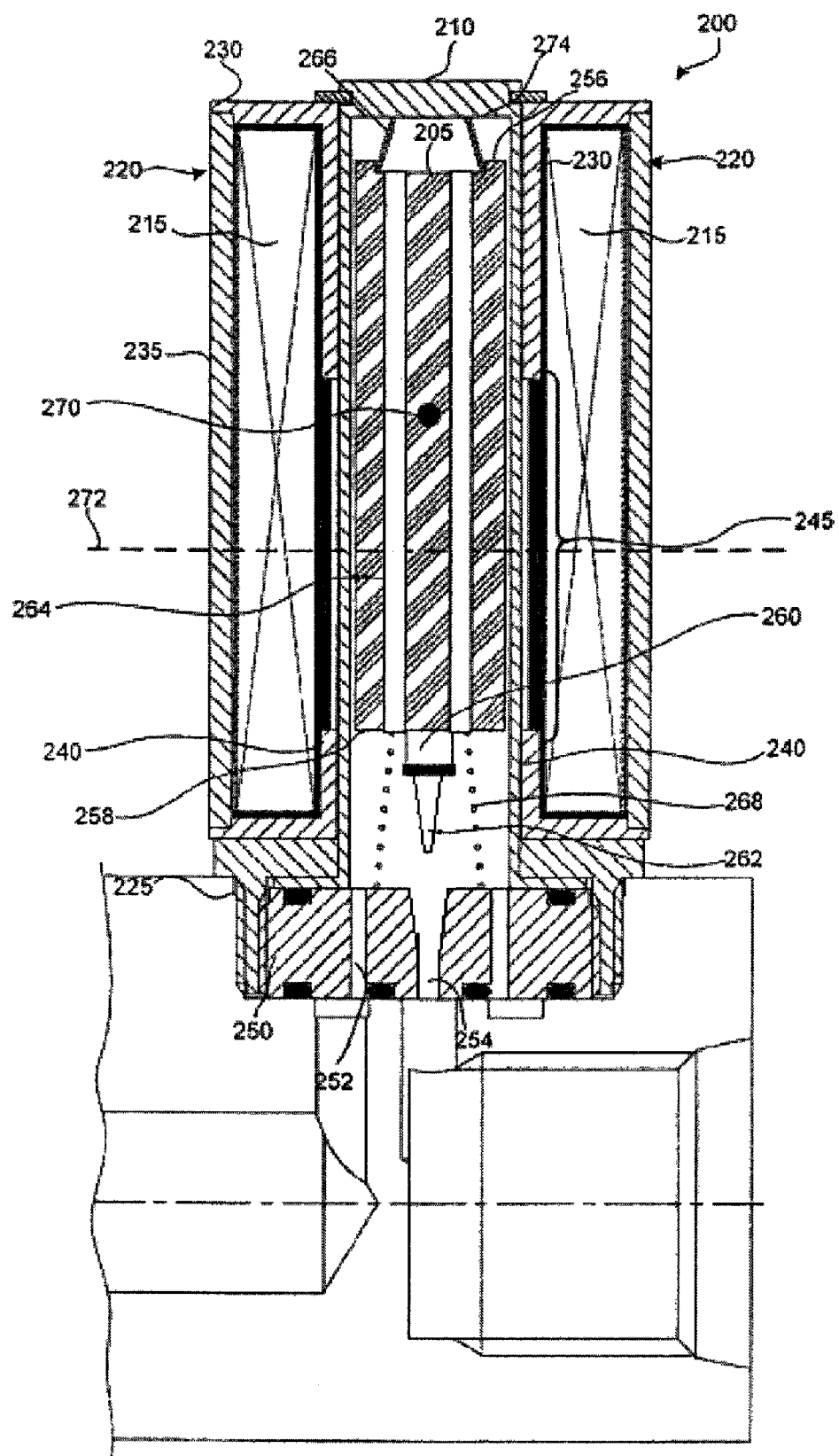
FIG. 3 is a schematic, cross-sectional view of a normally open valve assembly showing the valve assembly in an open position in accordance with certain of the embodiments.
Figure 4:
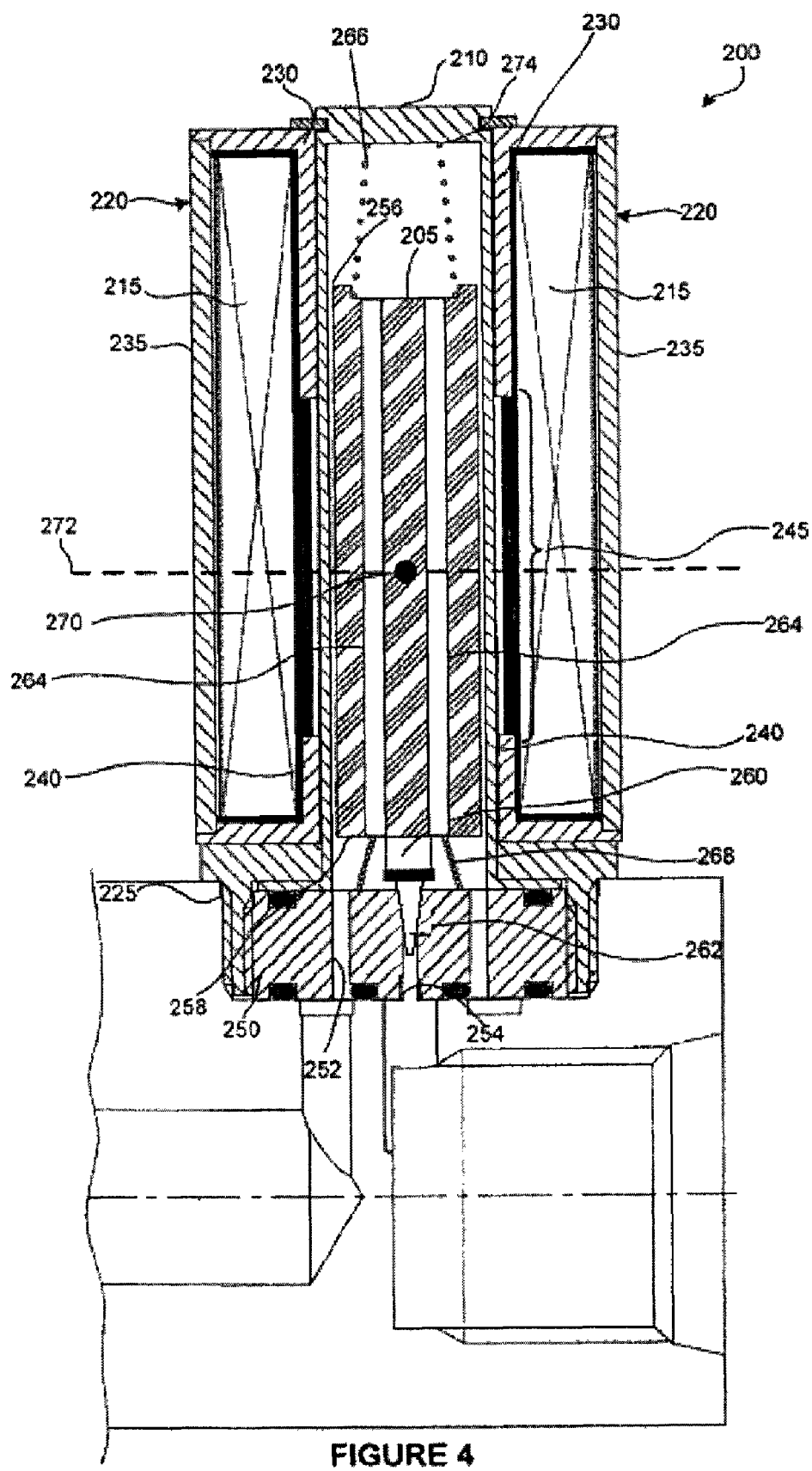
FIG. 4 is a schematic, cross-sectional view of the valve assembly of FIG. 3 showing the valve assembly in a closed position in accordance with certain of the embodiments.

Referring now to FIGS. 3 and 4, an illustrative valve assembly 200 is shown. The valve assembly 200 includes a core 205, core tube 210, coil 215, yoke assembly 220, and mounting body 225. The illustrative valve assembly 200 has a circular cross-section when viewed in a top plan view; however, it will be appreciated that the valve assembly 200 may have any suitable cross-section. The mounting body 225 includes an orifice body 250. The orifice body 250 includes a flow inlet 252 and a flow outlet 254. The mounting body 225 is operable to fluidly couple the valve assembly 200 to a flow body 800, such as a fluid conduit for transporting or carrying a fluid from one point to another, such that the orifice body 250 is disposed within a passageway for the flow of fluid whereby the fluid is capable of passing from the flow inlet 252 to the flow outlet 254. As will be discussed further below, the core 205 is operable to control the amount of fluid that is allowed to pass from the flow inlet 252 to the flow outlet 254 and thereby control the amount and/or rate of fluid that is permitted to pass through the flow body.

The core tube 210 encases the core 205. The core tube 210 is formed from any suitable material that is not ferromagnetic. The core tube 210 may be mounted to the mounting body 225 by any suitable means, including, but not limited to, adhesive, welding, mechanical fasteners, or any other suitable fastening means. Alternatively, the core tube 210 may be integrally formed with the mounting body 225. In yet another alternative, the core tube 210 may merely rest atop the mounting body 225.

The core 205 includes a proximal end 256 and a distal end 258. The distal end 258 includes a stop 260 and a needle 262 projecting therefrom. The needle 262 and flow outlet 254 are complimentarily shaped such that movement of the needle 262 relative to the flow outlet 254 permits proportional control of fluid passing from the flow inlet 252 through the flow outlet 254. For example, in the illustrative embodiment, the needle 262 and flow outlet 254 have complimentary tapered cross-sections whereby the needle 262 may be received within the flow outlet 254 such that when the needle 262 fully engages the flow outlet 254, the stop 260 rests atop the orifice body 250 and fluid is not permitted to pass through the flow outlet 254; this is referred to as the closed position. However, as will be discussed further below, as the core 205 is moved from the closed position to an open position, the needle 262 is withdrawn from the flow outlet 254 and fluid is permitted to pass from the flow inlet 252 to the flow outlet 254. As the needle 262 is withdrawn further from the flow outlet 254, the amount of fluid that is permitted to pass from the flow inlet 252 to the flow outlet 254 increases. While the illustrative embodiment shows the needle 262 and flow outlet 254 as having tapered cross-sections, it will be appreciated that the needle 262 and flow outlet 254 may have any suitable complimentarily shaped cross-sections. Additionally, in the illustrative embodiment, the core 205 is formed from a ferromagnetic material such that the core 205 may be excited and moved by the coil 215 when the coil 215 is energized; however, it will be appreciated that the core 205 may be formed from any suitable magnetic material. Moreover, the core 205 may have one or more grooves or slots 264 to prevent dashpot effects that may otherwise develop as the core 205 is moved between an open and closed position while fluid is passing from the flow inlet 252 to the flow outlet 254.

The core 205 is slidingly and concentrically disposed within the core tube 210 such that the core 205 is movable between an open position and a closed position relative to the orifice body 250. A first spring 266 is positioned between the proximal end 256 of the core 205 and the upper end of the interior portion of the core tube 210. A second spring 268 is positioned between the distal end 258 of the core 205 and the mounting body 225 near the upper portion of the orifice body 250. In the illustrative embodiment, the first spring 266 is a conical compression spring and the second spring 268 is a conical compression spring where the spring constant (k) of the second spring 268 is greater than the spring constant of the first spring 266 such that the core 205 is biased to an open position when the coil is not energized, i.e., the valve assembly 200 is "normally open" (FIG. 3). As will be discussed further below, the core 205 remains in an open position unless or until the coil 215 is energized. Also, while the illustrative embodiment employs conical compression springs, it will be appreciated that any type or number of resilient members, or biasing members, may be used to bias the core 205 to an open position, a closed position, or any other suitable position.

The coil 215 is disposed about the core tube 210. The coil 215 may be any magnetic inductive coil operable to generate a magnetic field that is capable of moving the core 205 between a closed position and an open position. The coil 215 is at least partially encased by the yoke assembly 220, which is formed from a ferromagnetic material or any other suitable magnetic material. The coil 215 and yoke assembly 220 may be maintained in position around the core tube via a retaining clip disposed about the top of the core tube and top of the yoke assembly 220; however, it will be appreciated that any suitable retaining means may be employed. The yoke assembly 220 includes a top yoke hub 230, a yoke 235 and a bottom yoke hub 240. Each of the top yoke hub 230, bottom yoke hub 240 and yoke 235 are generally tubular bodies and include an aperture for receiving the core tube 210 therein. A portion of each of the yoke hubs 230, 240 may extend into the yoke 235. The top yoke hub 230 and bottom yoke hub 240 may be coupled to the yoke 235 by any suitable means, including, but not limited to, adhesive, welding, mechanical fasteners, or any other suitable fastening means. Alternatively, the yoke hubs 230, 240 may abut or rest on or against the yoke 235.

The yoke assembly 220 is arranged such that a gap 245 exists between the top yoke hub 230 and bottom yoke hub 240. The gap 245 includes a center 272 that is the midpoint between the ends of the portions of the yoke hubs 230, 240 that extend into the yoke 235. The gap 245 is adjacent core tube 210 and permits magnetic flux generated by the coil 215, when the coil 215 is energized, to bridge the gap in the yoke assembly 220 through the core 205 and causes the core 205 to move. In other words, the yoke assembly 220 directs the magnetic flux generated by the coil 215 through the gap 245 such that when the coil 215 is energized, the center 270 of the core 205 (i.e., the core's center of gravity) is drawn towards the center 272 of the gap 245. Proportional control of core 205 is provided by controlling the amount of current provided to the coil 215. Thus, slight current provided to the coil 215 provides slight movement of the core 205, and when the coil 215 is fully energized, the center 270 of the core 205 and the center 272 of the gap 245 are aligned.

When the valve assembly 200 is normally open, as in the illustrative embodiment shown in FIGS. 3 and 4, the gap 245 is nearer the mounting body 225. In the normally open valve assembly, as shown in FIGS. 3-4, when the center 270 of the core 205 is aligned with the center 272 of the gap 245, the valve assembly 200 is fully closed.

The following description will be made in reference to the normally open valve assembly 200 of FIGS. 3 and 4. In use, the mounting body 225 is coupled to a flow body such that the orifice body 250 is introduced to a passageway for the flow of fluid whereby fluid is only permitted to further pass through the flow body by passing from the flow inlet 252 to the flow outlet 254. In the open position, the needle 262 is fully withdrawn from with the flow outlet 254 such that fluid is permitted to pass from the flow inlet 252 to the flow outlet 254.

As current is provided to the coil 215, the biasing force provided by the second spring 268 is overcome and the center 270 of the core 205 is pulled towards the center 272 of the gap 245 of the yoke assembly 220 and the needle 262 is drawn towards into the flow outlet 254 towards a closed position. The first spring 266 begins to extend and serves to maintain the core 205 in a centered position relative to the core tube 210 and coil 215. Slight increases in current provided to the coil 215 result in slight movement of the core 205 and slight closing of the valve assembly 200. As the current provided to the coil 215 increases, the core 205 is drawn closer to the orifice body 250 the distance between the needle 262 and the flow outlet 254 decreases. This results in a lesser amount of fluid that is permitted to pass from the flow inlet 252 to the flow outlet 254. When the coil 215 is fully energized, the center 270 of the core 205 is aligned with the center 272 of the gap 245 of the yoke assembly 220 and the valve is fully closed.

Figure 5:
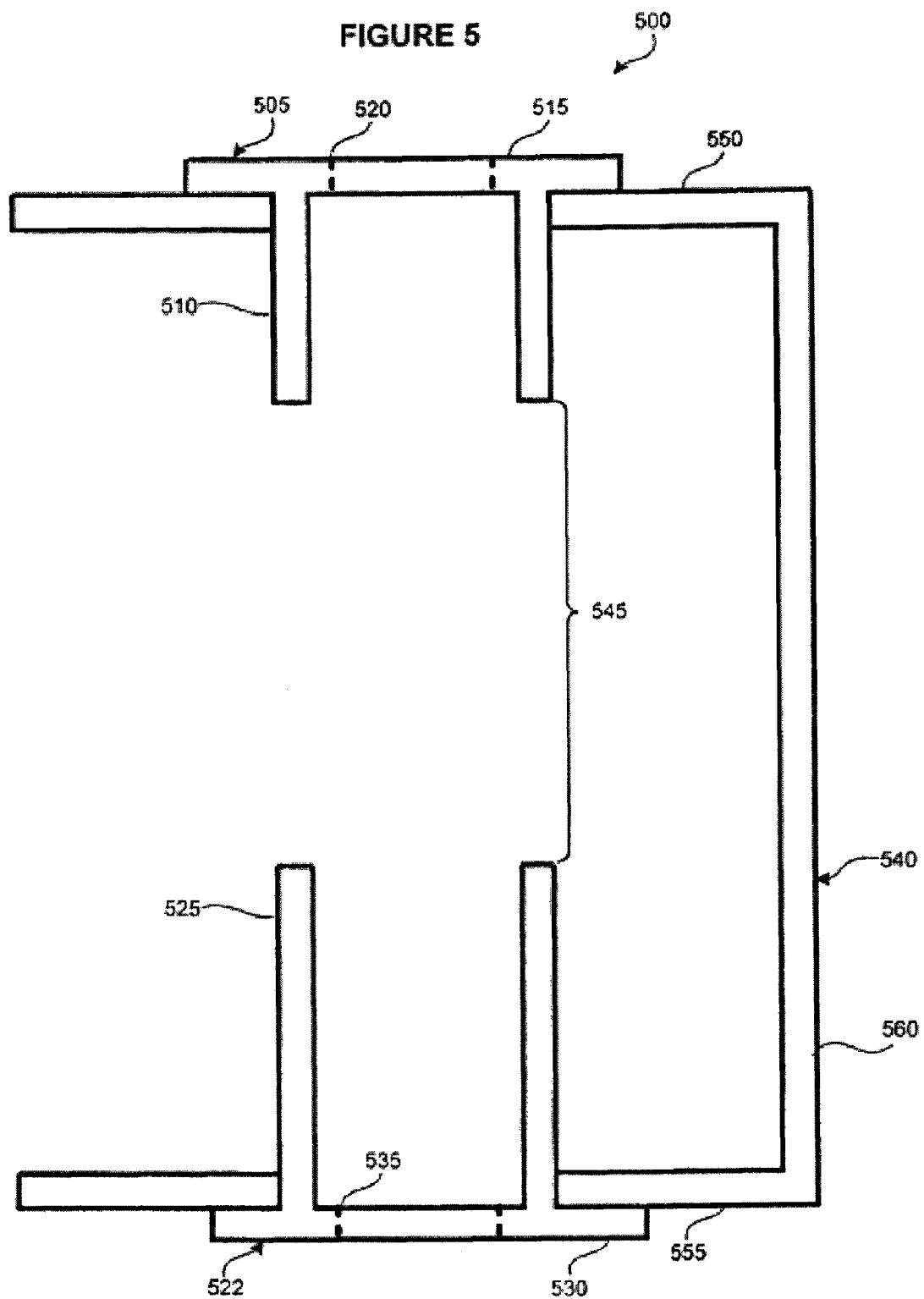
FIG. 5 is a schematic, cross-sectional view of an alternative yoke assembly in accordance with certain of the embodiments.
Figure 6:
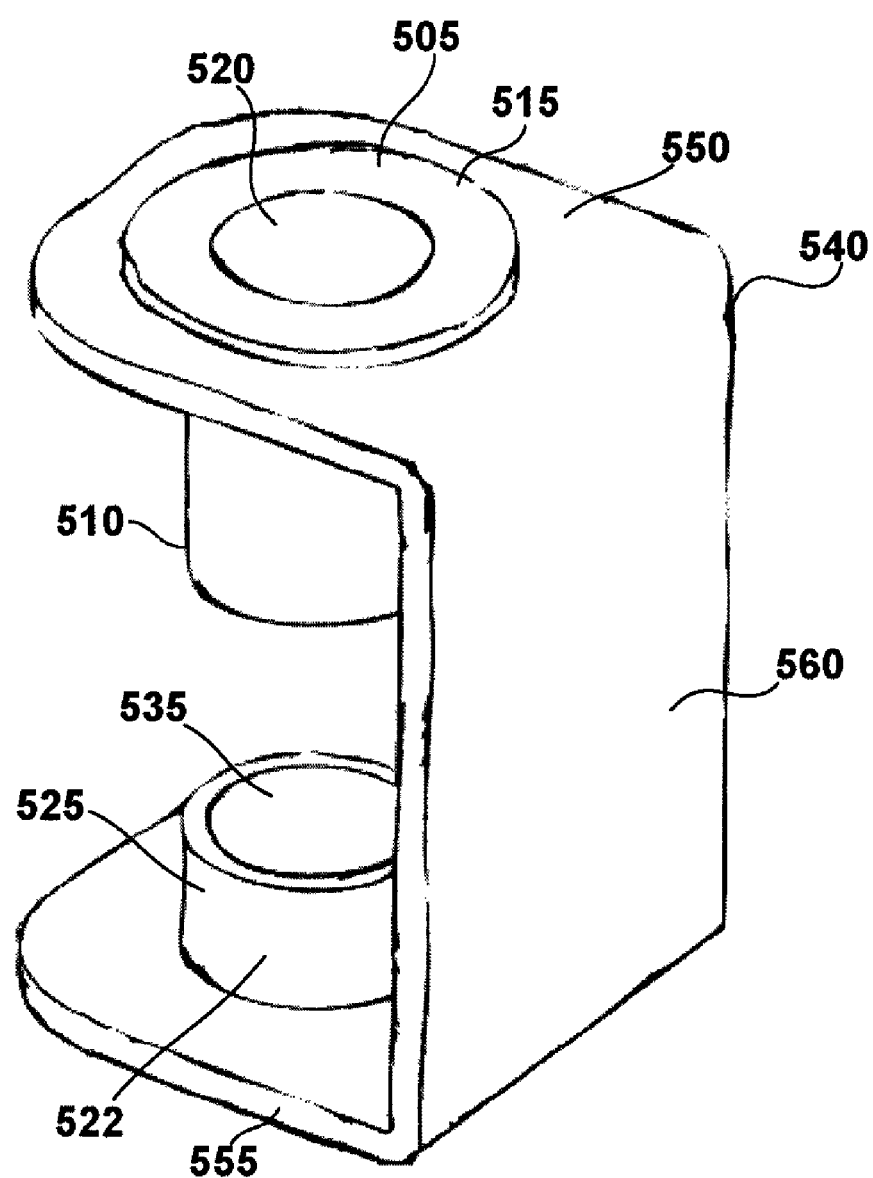
FIG. 6 is a schematic, perspective view of the yoke assembly of FIG. 5 in accordance with certain of the embodiments.

FIGS. 5 and 6 show an alternative embodiment of a yoke assembly 500 for use in a valve assembly 100, 200 similar to that as shown in FIGS. 1-4. The upper yoke hub 505 has a tubular body 510 and a flange 515. The upper yoke hub 505 includes an aperture 520 for receiving a core tube therein. The lower yoke hub 522 has a tubular body 525 and a flange 530. The lower yoke hub 522 includes an aperture 535 for receiving a core tube therein. The upper and lower yoke hubs 505, 522 are connected by a yoke 540 such that a gap 545 exists therebetween. Unlike the yoke 135 of FIGS. 1-4, which is generally tubular in shape, the present yoke 540 is a bracket that connects the yoke hubs 505, 522 to one another. For example, the yoke 540 may be a piece of sheet metal formed with two 90-degree angles such that the yoke hubs 505, 522 may be connected thereby; an upper portion 550 is coupled to the upper yoke hub 505 and a lower portion 555 is connected to the lower yoke hub 522, wherein the upper and lower portions 550, 555 are coupled together via a central portion 560. However, it will be appreciated that the yoke hubs 505, 522 may be connected by any suitable means and a yoke assembly in accordance with the present invention is not limited to employing either a tubular yoke 135 or a bracket yoke 540.

The disclosed embodiments provide several advantages over the existing control-valves. For example, the disclosed embodiments provide for a long stroke actuator, as opposed to a short stroke actuator, such as, but not limited to, a poppet valve. By providing a long stroke actuator, the disclosed embodiments enables precise control of fluid flow in proportion to an amount of current provided to the control valve. In addition, the disclosed embodiments utilize low precision yoke hubs that are mounted in unwetted space (i.e., not in contact with potentially corrosive process fluids).

Additionally, because the fail mode of a valve is often not determined until late in the development process, certain of the disclosed embodiments may be converted from a normally-open mode to a normally-closed mode, and vice versa, by simply replacing the top and bottom springs (e.g., first and second springs 166 and 168) and the yoke hubs. In some embodiments, the top and bottom springs and/or the top and bottom yoke hubs may simply be swapped to convert from a normally-open mode to a normally-closed mode, and vice versa. In other embodiments, the top and bottom springs and/or the top and bottom yoke hubs may be replaced with different springs (e.g., having a different spring constant (k)) and/or different yoke hubs respectively. Therefore, the disclosed embodiments reduce inventory costs associated with maintaining normally-open and normally closed valves, and increases customer-responsiveness.

Further, in certain embodiments, the valve fashioned in a single unit that is easily inserted and replaceable in a mass flow controller. In other words, all of the 'works' of the valve come within a single subassembly. This embodiment offers several advantages, such as, but not limited to, removing from the balance of the instrument any critical dimensional features (lowering its cost), as well as easing the development-path to adding embodiments of the disclosed valve onto many disparate products and assemblies. Accordingly, the disclosed embodiments maintain low-cost and high-manufacturability while yielding a precise flow control resolution.

Although the present invention and its advantages have been disclosed in the context of certain illustrative, non-limiting embodiments, it should be understood that various changes, substitutions, permutations, and alterations can be made without departing from the scope of the invention as defined by the appended claims. It will be appreciated that any feature that is described in a connection to any one embodiment may also be applicable to any other embodiment.

The invention claimed is:

1. A valve comprising:
   a mounting body having a fluid inlet and a fluid outlet;
   a core tube adjacent to the mounting body, the core tube having an interior chamber with a proximal end and a distal end;
   a core slidingly disposed within the core tube interior chamber, the core having a proximal end, a distal end and a center located between the proximal end and the distal end, the core movable between an open position and a closed position relative to the mounting body, wherein the core distal end engages at least one of the mounting body fluid inlet and mounting body fluid outlet to block fluid flow therethrough when the core is in the closed position;
   at least one biasing member operable to bias the core in at least one of the open and closed positions;
   a coil disposed about the core tube, the coil operable to cause the core to move between the open position and the closed position when energized;
   a yoke encasingly disposed about the coil, the yoke having an opening adjacent to the core tube, the opening having a center, wherein a distance between the core center and the yoke opening center decreases when the coil is energized, wherein the yoke comprises a bottom tubular yoke hub and a top tubular yoke hub;
   a second biasing member positioned at one of the proximal end or the distal end of the core opposite the at least one biasing member, the second biasing member having a spring constant less than a spring constant of the at least one biasing member when the coil is not energized;
   wherein switching the valve from one of a normally-closed valve and a normally-opened valve to the other of the normally-closed valve and the normally-opened valve comprises swapping the at least one biasing member with the second biasing member and vice versa, and swapping the bottom tubular yoke hub with the top tubular yoke hub and vice versa.

2. The valve of claim 1, wherein magnetic flux generated by the coil when energized is directed through the opening of the yoke to cause the core to move.

3. The valve of claim 1, wherein the distance between the core center and the yoke opening center changes in proportion to an amount of current provided to the coil.

4. The valve of claim 1, wherein the core center and the yoke opening center are in substantial alignment when the coil is fully energized.

5. The valve of claim 1, wherein the valve is a normally-closed valve.

6. The valve of claim 1, wherein the valve is a normally-opened valve.

7. The valve of claim 5, wherein the fluid flow from the fluid inlet to the fluid outlet increases in proportion to a decrease of the distance between the core center and the yoke opening center.

8. The valve of claim 6, wherein the fluid flow from the fluid inlet to the fluid outlet decreases in proportion to a decrease of the distance between the core center and the yoke opening center.

9. The valve of claim 1, wherein the core tube is formed from non-ferromagnetic material and the core is formed from ferromagnetic material.

10. The valve of claim 1, wherein the core comprises one or more grooves to reduce viscous friction when the core is moving.

11. The valve of claim 1, wherein the valve is a single replaceable unit of a mass flow controller.

12. The valve of claim 1, further comprising a fastener disposed atop the yoke and the core tube for connecting the yoke to the core tube.

13. A valve comprising:
   a mounting body having a fluid inlet and a fluid outlet;
   a core tube adjacent to the mounting body, the core tube having an interior chamber with a proximal end and a distal end;
   a core slidingly disposed within the core tube interior chamber, the core having a proximal end, a distal end and a center located between the proximal end and the distal end, the core movable between an open position and a closed position relative to the mounting body, wherein the core distal end engages at least one of the mounting body fluid inlet and mounting body fluid outlet to block fluid flow therethrough when the core is in the closed position;
   at least one biasing member operable to bias the core in at least one of the open and closed positions;
   a coil disposed about the core tube, the coil operable to cause the core to move between the open position and the closed position when energized;
   a yoke encasingly disposed about the coil, the yoke having an opening adjacent to the core tube, the opening having a center, wherein a distance between the core center and the yoke opening center decreases when the coil is energized, wherein the yoke comprises a bottom tubular yoke hub and a top tubular yoke hub;

a second biasing member positioned at one of the proximal end or the distal end of the core opposite the at least one biasing member, the second biasing member having a spring constant less than a spring constant of the at least one biasing member when the coil is not energized;

wherein switching the valve from one of a normally-closed valve and a normally-opened valve to the other of the normally-closed valve and the normally-opened valve comprises swapping the at least one biasing member with the second biasing member and vice versa, and swapping the bottom tubular yoke hub with a second bottom tubular yoke hub and the top tubular yoke hub with a second top tubular yoke hub.

14. A valve comprising:

a mounting body having a fluid inlet and a fluid outlet;

a core tube adjacent to the mounting body, the core tube having an interior chamber with a proximal end and a distal end;

a core slidingly disposed within the core tube interior chamber, the core having a proximal end, a distal end and a center located between the proximal end and the distal end, the core movable between an open position and a closed position relative to the mounting body, wherein the core distal end engages at least one of the mounting body fluid inlet and mounting body fluid outlet to block fluid flow therethrough when the core is in the closed position;

at least one biasing member operable to bias the core in at least one of the open and closed positions;

a coil disposed about the core tube, the coil operable to cause the core to move between the open position and the closed position when energized;

a yoke encasingly disposed about the coil, the yoke having an opening adjacent to the core tube, the opening having a center, wherein a distance between the core center and the yoke opening center decreases when the coil is energized, wherein the yoke comprises a bottom tubular yoke hub and a top tubular yoke hub;

a second biasing member positioned at one of the proximal end or the distal end of the core opposite the at least one biasing member, the second biasing member having a spring constant less than a spring constant of the at least one biasing member when the coil is not energized;

wherein at least one of the bottom tubular yoke hub and the top tubular yoke hub comprises a tubular body, a flange, and an aperture for receiving the core therein.

15. The valve of claim 14, wherein both the bottom tubular yoke hub and the top tubular yoke hub each comprise a tubular body, a flange, and an aperture for receiving the core therein.

* * * * *